US007040056B2

(12) United States Patent

DuBose et al.

(10) Patent No.: US 7,040,056 B2

(45) Date of Patent: May 9, 2006

(54) GEAR SHAFT ASSEMBLY

(76) Inventors: Monty C. DuBose, 299 Coleman Blvd., Mt. Pleasant, SC (US) 29464; William McCaw Howe, 511 Deer St., Mt. Pleasant, SC (US) 29464

( * ) Notice: Subject to any disclaimer, the term of this patent is extended or adjusted under 35 U.S.C. 154(b) by 261 days.

(21) Appl. No.: 10/807,711

(22) Filed: Mar. 24, 2004

(65) Prior Publication Data

US 2005/0210749 A1 Sep. 29, 2005

(51) Int. Cl.

*E05F 17/00* (2006.01)
*E05F 11/34* (2006.01)
*E05C 7/02* (2006.01)
*F16H 3/06* (2006.01)

(52) U.S. Cl. ............................... 49/116; 49/118; 49/63; 49/362; 74/89.23; 74/424.71

(58) Field of Classification Search .................. 49/116, 49/118, 362, 360, 61, 63, 117, 366, 367, 348, 49/350, 349; 74/89.23, 424.71, 89.13, 89.14, 74/89.15, 724, 424.5, 424.7, 424.8 R, 89.25

See application file for complete search history.

(56) References Cited

U.S. PATENT DOCUMENTS 1,816,258 A 7/1931 Lake
3,330,071 A 7/1967 Kubisiak
3,452,477 A 7/1969 Sassano
4,068,799 A * 1/1978 Brodin ...................... 236/49.3
4,229,907 A 10/1980 Hall
4,365,441 A 12/1982 Davidson
4,370,826 A 2/1983 Davidson
4,565,104 A * 1/1986 Akin ......................... 74/89.23
4,698,938 A * 10/1987 Huber ......................... 49/118
5,150,872 A * 9/1992 Isomura ..................... 74/89.14
5,309,677 A * 5/1994 Kunert et al. ................. 49/362
5,313,852 A * 5/1994 Arena ....................... 74/89.13
5,469,905 A 11/1995 McKinney et al.
5,487,244 A 1/1996 Hill (Continued)

FOREIGN PATENT DOCUMENTS

WO WO 2004/009940 A1 1/2004

OTHER PUBLICATIONS

McMaster-Carr Supply Company, pp. 2550-2555, catalog 103, Atlanta, GA., United States, no month & date available.

*Primary Examiner*—Hugh B. Thompson, II
(74) *Attorney, Agent, or Firm*—Harleston Law Firm,LLC; Kathleen M. Harleston

(57) ABSTRACT

A gear shaft assembly for actuating linear movement of an object, including a lower channel assembly, which includes: (a) a threaded rod; (b) a first gear adjacent an end of the threaded rod; (c) a second gear engageable with the first gear and attached to the end of the threaded rod; (d) a mechanism for driving the first gear against the second gear; (e) at least one threaded journal bearing threaded on the correspondingly threaded rod; (f) at least one bearing housing supporting the at least one journal bearing; (g) a movable carrier arm mounted on the threaded rod and attachable to the object; wherein, when the drive mechanism activated, the first gear drives the second gear, rotating the threaded rod, and moving the carrier arm on the threaded rod. A tandem gear shaft assembly and a method for installing a gear shaft assembly and shutter on a window are also included.

24 Claims, 9 Drawing Sheets

U.S. PATENT DOCUMENTS

| | | | | |
|---|---|---|---|---|
| 5,540,018 | A | 7/1996 | Biggers | |
| 5,595,233 | A | 1/1997 | Gower | |
| 5,596,849 | A | 1/1997 | Hill | |
| 5,740,639 | A | 4/1998 | Covington | |
| 5,755,270 | A | 5/1998 | Knezevich et al. | |
| 5,809,833 | A * | 9/1998 | Newport et al. | 74/89.37 |
| 5,826,377 | A * | 10/1998 | Simson et al. | 49/362 |
| 5,857,298 | A | 1/1999 | Fullwood | |
| 5,907,929 | A | 6/1999 | Poma et al. | |
| 5,957,186 | A | 9/1999 | Boswell | |
| 6,142,426 | A * | 11/2000 | Zaro et al. | 74/89.23 |
| 6,189,264 | B1 | 2/2001 | DeVeroli | |
| 6,370,975 | B1 * | 4/2002 | Nagai et al. | 74/89.25 |
| 6,378,254 | B1 | 4/2002 | Gould | |
| 6,449,902 | B1 | 9/2002 | Tumin | |
| 6,658,793 | B1 | 12/2003 | Perron | |
| 6,918,208 | B1 * | 7/2005 | Oberheide et al. | 74/89.14 |

* cited by examiner

GEAR SHAFT ASSEMBLY

BACKGROUND OF THE INVENTION

1. Technical Field

The present invention relates to a mechanical device for actuating linear movement of an object and, more particularly, a mechanical device for opening and closing hurricane shutters or the like.

2. Background Information

In coastal areas that are frequently subjected to the threat of an approaching hurricane, homeowners and business owners often install hurricane shutters to protect glass windows or doors. It is known that glass windows or doors may shatter upon impact with an object propelled by the winds of a hurricane, subjecting the building's interior space to wind and water damage. Many homeowners and business owners employ hurricane shutters because they are more convenient than securing plywood over window openings, particularly since time is often tight when a hurricane is approaching the coast. Hurricane shutters are permanently affixed to a building and need only be opened and closed, while plywood must be attached as the hurricane approaches, and then detached after the hurricane or hurricane threat is over. Also, plywood supplies at local stores are often depleted as the hurricane approaches and homeowners rush to the stores to purchase plywood. There are several different types of commercially available hurricane shutters, including roll-down shutters, Bahamas shutters, colonial shutters, accordion shutters, and storm panels, each of which is discussed below.

Roll-down shutters have many connected slats. When it is not in use, the roll-down shutter can be rolled up for storage into a box mounted above a window. The slats, guided by tracks, roll vertically down to cover the window. The position of roll-down shutters is ordinarily changed from inside the building. Roll-down shutters may be manually operated with a hand crank, or automatically operated by an electric motor. Unfortunately, roll-down shutters are often expensive to purchase.

Bahamas shutters form attractive awnings when they are open. A hinge attaches a top edge of the Bahamas shutter to an exterior face of a building immediately above a window opening, so the shutter pivots towards and away from the window. Telescoping side arms hold Bahamas shutters in position over the window. Bahamas shutters must be manually opened and closed from outside the building.

Colonial shutters are mounted at the sides of a window and fold over the window. They must also be manually opened and closed from outside the building.

Accordion shutters have many connected panels that move horizontally along a lower track and an upper track. An accordion shutter made be any width, but its height is restricted according to the elevation at which it is hung. Accordion shutters are manually operated, can be fairly expensive, require frequent maintenance, and are not particularly aesthetically appealing.

Like plywood, storm panels are fastened over windows when a hurricane is imminent and stored during the rest of the year. Storm panels fit into tracks in window frames. Unfortunately, they require time-consuming outdoor installation (and later detachment), are usually heavy, and they require a substantial amount of storage space.

Roll-down shutters are expensive and, as previously mentioned, the other shutters have various shortcomings. With the exception of roll-down shutters, all of these shutters must be manually operated from outside the building. Even if ground floor windows are manageable, outdoor manipulation of shutter mechanisms for second floor windows and above requires use of a ladder. The elderly and infirm in particular can have difficulty installing hurricane protective panels and the like, especially when they are anxious about the approaching storm. When a hurricane is approaching, it is next to impossible to find an available professional service to perform the task either. Thus, there is a need for an inexpensive and effective hurricane shutter system that is easy for lay people of any age to use.

The present invention may be employed as part of a hurricane shutter system with shutters that can easily be opened or closed manually or automatically from the interior of the building. In fact, the present gear shaft assembly can be utilized in a variety of systems for moving an object in a linear direction.

BRIEF SUMMARY OF THE INVENTION

The present invention is a gear shaft assembly for actuating linear movement of an object attached thereto. The present gear shaft assembly includes a lower channel assembly, which includes:

(a) a threaded rod;

(b) a first gear adjacent an end of the threaded rod;

(c) a second gear engageable with the first gear and attached to the end of the threaded rod;

(d) a mechanism for driving the first gear against the second gear;

(e) at least one threaded journal bearing threaded on the correspondingly threaded rod;

(f) at least one bearing housing supporting the at least one journal bearing;

(g) a movable carrier arm mounted on the threaded rod and attachable to the object;

wherein, when the mechanism for driving the first gear against the second gear is activated, the first gear drives the second gear, rotating the threaded rod, and moving the carrier arm on the threaded rod. Also included herein is a method of installing a gear shaft assembly and shutter on a window.

Also included herein is a tandem gear shaft assembly for actuating simultaneous linear movement of two objects attached thereto. The tandem gear shaft assembly includes a second lower channel assembly, which includes:

(a) two same-sized threaded rods oriented in the same direction as one another;

(b) a first gear between two ends of the two threaded rods;

(c) two same-sized second gears, each engageable with the first gear and attached to the end of each of the threaded rods;

(d) a mechanism attached to the first gear for driving the first gear against the second gears;

(e) at least two same-sized threaded journal bearings, each threaded on one of the correspondingly threaded rods;

(f) at least two same sized bearing housings, each holding one of the at least two journal bearings; and (g) two same sized movable carrier arms, each mounted on one of the threaded rods, each being attached to one of the objects.

BRIEF DESCRIPTION OF THE SEVERAL VIEWS OF THE DRAWINGS

A more complete understanding of the invention and its advantages will be apparent from the following detailed description taken in conjunction with the accompanying drawings, wherein examples of the invention are shown, and wherein.

DETAILED DESCRIPTION OF THE INVENTION

Figure 1:
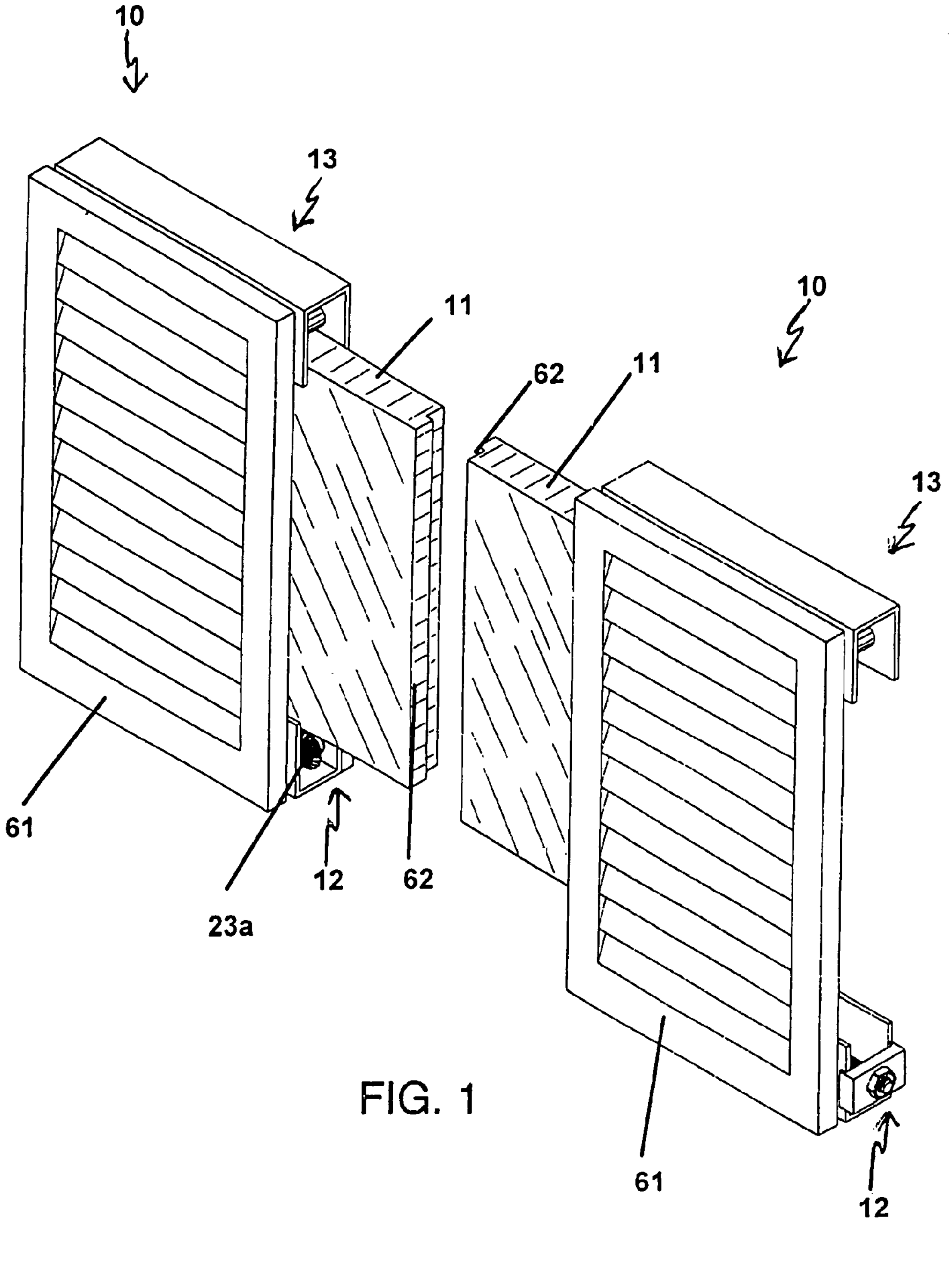
FIG. 1 is a front perspective view of portions of two mirror image gear shaft assemblies according to the present invention, each operably connected to a hurricane shutter panel.

In the following description, like reference characters designate like or corresponding parts throughout the several views. Also, in the following description, it is to be understood that such terms as "front," "back," "within," and the like are words of convenience and are not to be construed as limiting terms. Referring in more detail to the drawings, the invention will now be described.

Figure 2:
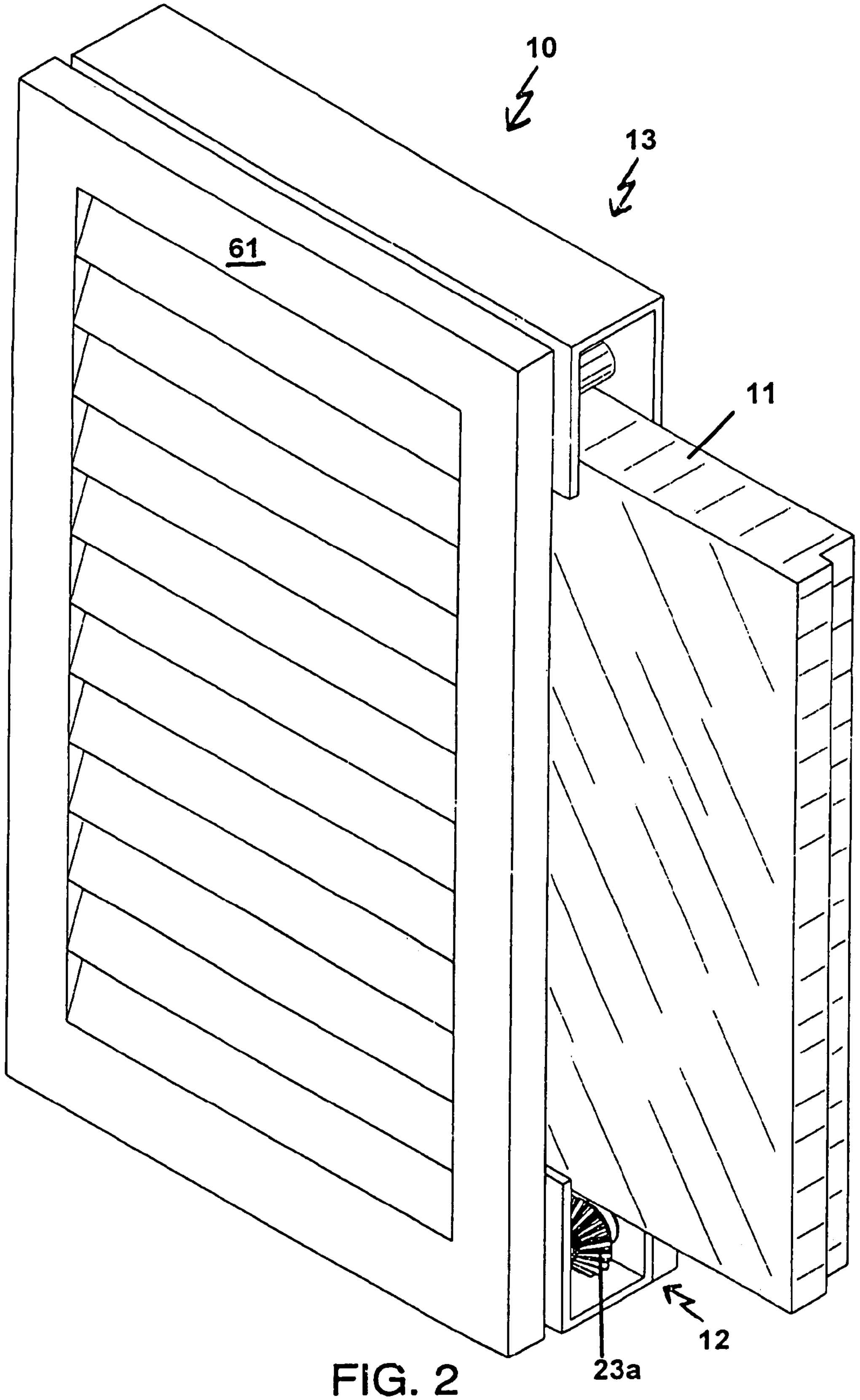
FIG. 2 is an enlarged front perspective view of a gear shaft assembly according to FIG. 1, shown operably connected to a hurricane shutter panel.
Figure 3:
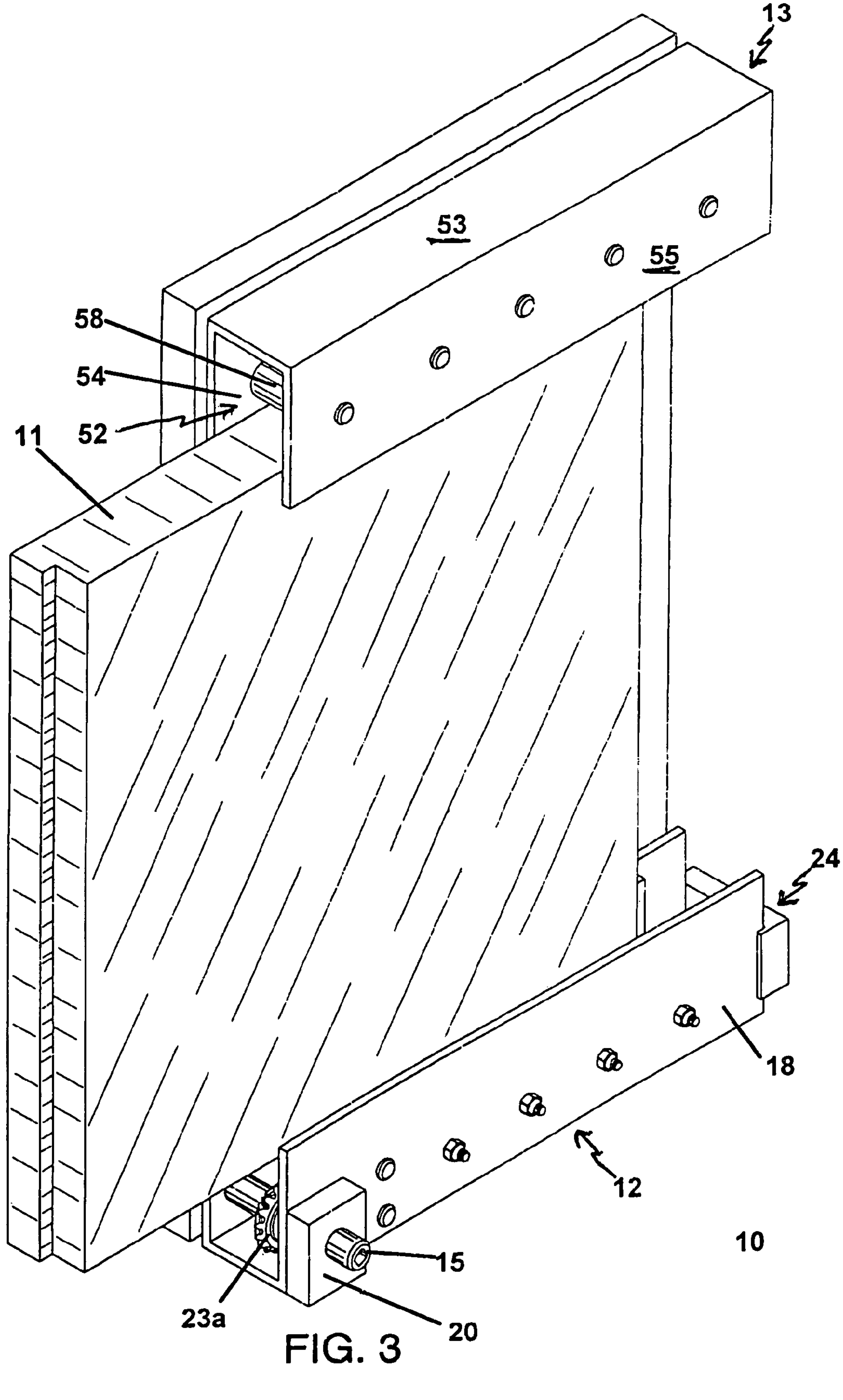
FIG. 3 is an enlarged rear perspective view of a gear shaft assembly according to FIG. 1, shown operably connected to a hurricane shutter panel.

The present invention is a gear shaft assembly, generally referred to by reference number 10, for actuating linear movement of an object, preferably a hurricane shutter. Referring to FIG. 1, in a preferred embodiment, two gear shaft assemblies 10 actuate linear movement of two horizontal hurricane shutter panels 11 or the like. The gear shaft assemblies can be used to open and close hurricane shutter panels or the like. A hurricane shutter comprising the present gear shaft assembly is capable of withstanding high strength tropical storm or hurricane-force winds, and impact from flying debris driven by such winds. The hurricane shutter comprising the present invention therefore protects the window or door it covers, and the home or building behind it. Of course, it cannot protect against all hurricane force winds (e.g., Category 5) or flying debris. This hurricane shutter can be operated from inside (preferably) or outside the home or building by hand or using a motorized mechanism. The gear shaft assembly 10 is adaptable to fit windows or doors of various widths. As seen in FIGS. 1 through 3 the gear shaft assembly 10 is comprised of a lower channel assembly 12 below the hurricane shutter panel 11, and an upper channel assembly 13 above the hurricane shutter panel 11.

Figure 4:
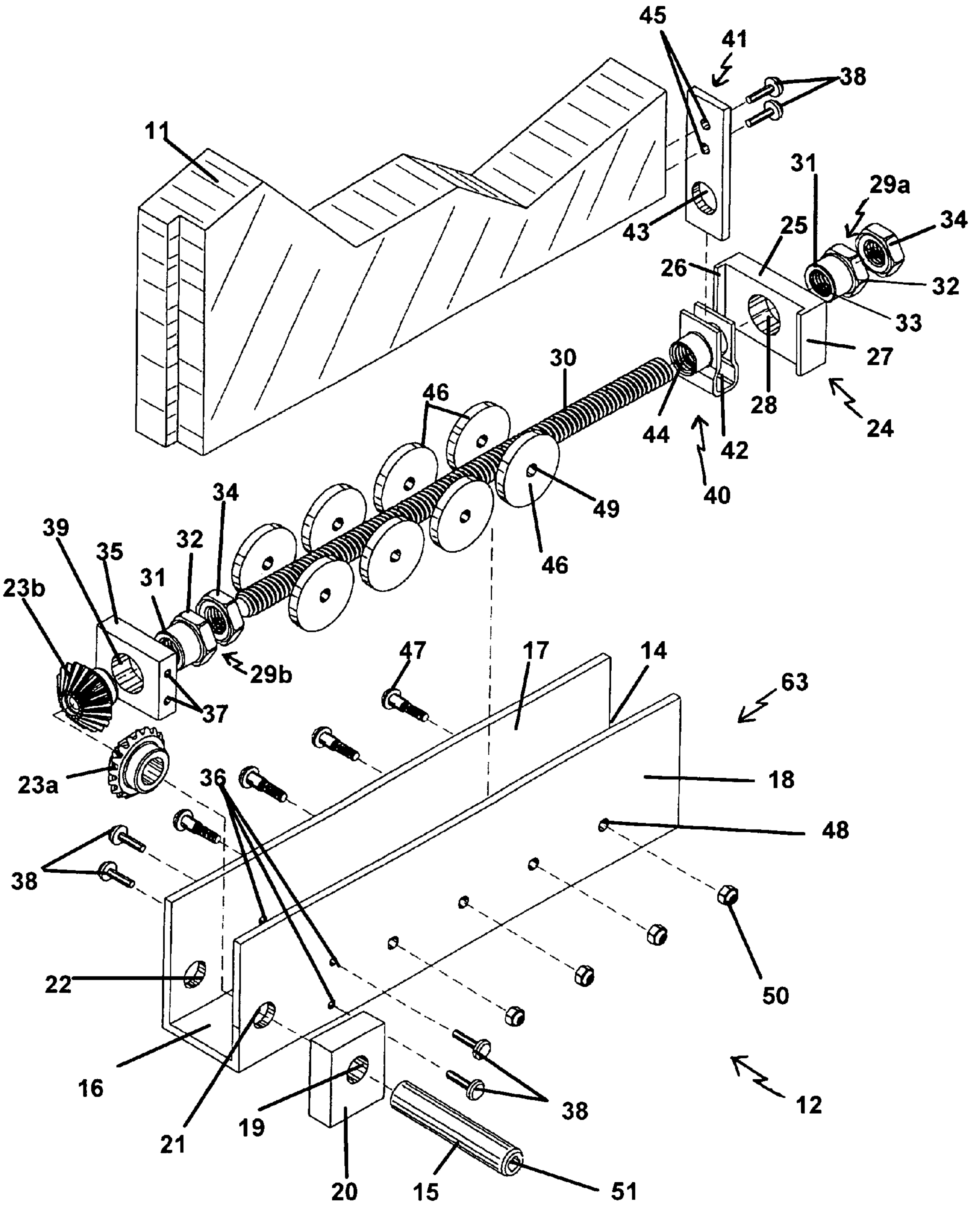
FIG. 4 is an exploded perspective view of a lower channel assembly of a gear shaft assembly, and a portion of a hurricane shutter panel, according to the present invention.
Figure 5:
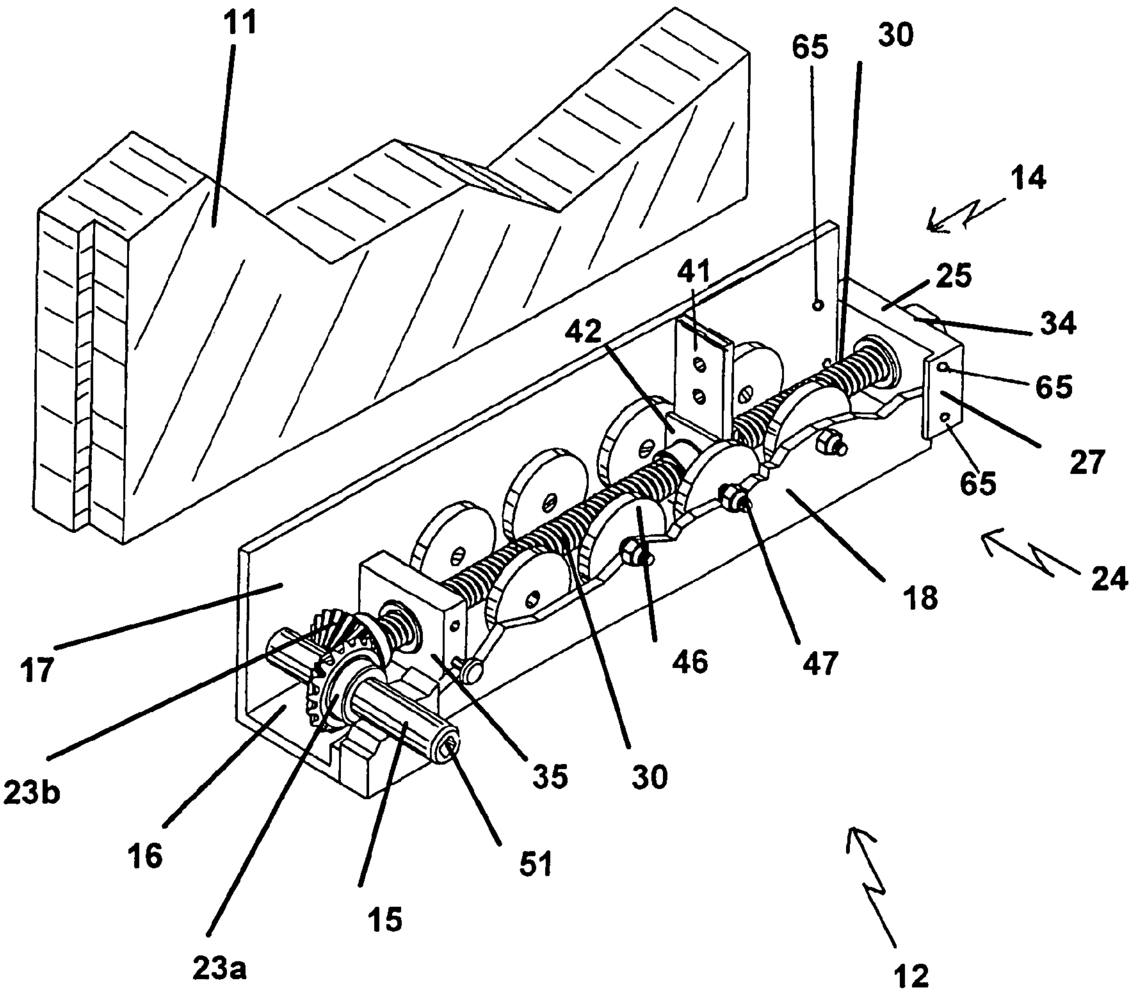
FIG. 5 is a cutaway perspective view of a lower channel assembly of a gear shaft assembly according to FIG. 1, shown with a portion of a detached hurricane shutter panel.

Turning to FIGS. 4 and 5, the lower channel assembly 12 comprises a U-shaped lower housing 63, which houses a drive shaft 15. The lower housing 63 comprises a lower housing channel 14 formed from a lower housing bottom wall 16, front wall 17, and rear wall 18, each of which is generally rectangular in shape. The lower housing front wall 17 and rear wall 18 are substantially perpendicularly oriented to the lower housing bottom wall 16, and extend generally vertically upward from the lower housing bottom wall 16. The drive shaft 15 extends through a first aperture 19 in a shaft support 20, a second aperture 21 in the lower housing rear wall 18, and a third aperture 22 in the lower housing front wall 17. The shaft support 20 is generally square in shape and connected to the side of the lower housing rear wall 18 opposite the lower channel 14. The first, second and third apertures 19, 21, 22 are preferably generally circular in shape and have diameters approximately equal to the outer diameter of the drive shaft 15, so the drive shaft fits closely within the lower housing apertures. The drive shaft 15 is rotatable within the first, second and third apertures 19, 21, 22. A square-shaped orifice 51 extends through the longitudinal center of the drive shaft 15.

Continuing with FIGS. 4 and 5, a first gear **23*a*, preferably a 45 degree mitered gear, is mounted on the drive shaft 15 within the lower channel 14, so that its teeth face the lower housing front wall 17. An identical, second gear 23*b* within the lower channel 14 is oriented substantially perpendicularly to the first gear 23*a*. The second gear 23*b* is meshed with the first gear 23*a* such that rotation of the first gear 23*a* in one direction induces rotation of the second gear 23*b* in the same direction, and rotation of the first gear 23*a* in the opposite direction induces rotation of the second gear 23*b*** in the opposite direction.

Any other suitable mechanism for driving the first gear against the second gear may be employed in place of a drive shaft 15. The driving mechanism may be manual, mechanical, or automatic. When the mechanism for driving the first gear against the second gear, preferably the drive shaft 15, is activated, the first gear **23*a* drives the second gear 23*b*, rotating the threaded rod 30, and moving the carrier arm 41 on the threaded rod. Spur, bevel, or worm gears may be used instead of or with mitered gears. The first and second gears 23*a*, 23*b***, which are preferably made of a plastic material, may be any size or ratio. The threaded rod may be made of steel or any suitable rigid material.

An external bearing housing 24 is attached to the end of the lower housing 63 opposite the drive shaft 15 (see FIGS. 4 and 5). Preferably the external bearing housing 24 has a substantially rectangular-shaped central section 25, which abuts the end of the lower housing channel 14 opposite the drive shaft 15, and two mirror-image, substantially rectangular-shaped arms 26, 27. The external bearing housing front arm 26 and rear arm 27 each extend substantially perpendicularly from an opposite side of the central section 25 toward the mitered gear end of the assembly. As seen in FIGS. 1, 3, and 5, the external bearing housing front arm 26 and rear arm 27 hug the outside of the lower housing front wall 17 and rear wall 18, respectively. The arms 26, 27 are preferably attached to the lower housing by means of housing pins 65, preferably pressed-in split pins, inserted in lower housing through bores. The housing pins 65 hold the external bearing housing 24 in the lower channel assembly 12.

Continuing with FIGS. 4 and 5, the external bearing housing 24 supports a threaded rod 30, which extends through the lower housing channel 14 along a longitudinal axis of the lower housing 63. A portion of a journal bearing **29*a* extends into a fourth aperture 28 through the central section 25. The journal bearing 29*a* is threaded on an end portion of the threaded rod 30. The threaded rod 30 is preferably of a type called an all-thread rod. An all-thread rod is available in different lengths, diameters, and thread sizes. The journal bearing 29***a* is comprised of a screw boss 31 joined to one side of a nut portion 32. A threaded, generally circular, fifth aperture 33 extends longitudinally through the journal bearing 29*a*. The end portion of the threaded rod 30 is held within the journal bearing 29*a* by a threaded lock nut 34, which is threaded on the rod 30 and abuts the nut portion 32 of the journal bearing 29*a*. As the rod 30 turns, the smooth outer surface of screw boss 31 slides against the smooth inner surface of the fourth aperture 28. This is advantageous in that the threading at the end of the rod 30 where the rod extends into the external bearing housing 24 is not worn down over time. The lock nuts 31, 34 also allow for securement and adjustment of the mitered gears 23*a,b*.

Although other means of holding the threaded rod within the journal bearing may be employed, the lock nut is preferred for its simplicity. The journal bearing and lock nut permit alteration of the threaded rod, if desired, to fit different size windows. The rod may be shortened and the journal bearing and lock nut reapplied, and the gear shaft assembly 10 will work just as well.

On the opposite end of the round threaded rod 30 adjacent to the drive shaft 15, an internal bearing housing 35 transversely spans the lower channel 14, as shown in FIGS. 4 and 5. The internal bearing housing 35 is generally rectangular in shape and rests on the lower housing bottom wall 16. Rivets 38 extending through generally circular lower channel rivet holes 36 in the lower housing front wall 17 and rear wall 18 and generally circular internal bearing housing rivet holes 37 secure the internal bearing housing 35 within the lower housing channel 14. As shown in FIG. 4, a generally circular, sixth aperture 39 in the internal bearing housing 35 supports the screw boss 31 of a second journal bearing 29*b*, which is identical to the first journal bearing 29*a*. The second journal bearing 29*b* is oriented such that its upper nut portion 32 abuts the side of the internal bearing housing 35 that faces the external bearing housing 24. The second journal bearing 29*b* is threaded on the opposite end portion of the threaded rod 30. Another threaded lock nut 34 threaded on the threaded rod 30 abuts the hexagonal nut portion 32. This secures this end portion of the threaded rod 30 in place within the second journal bearing 29*b*, as seen in FIG. 5. The rotatable threaded rod 30 is stationary between the two journal bearings. The journal bearings 29*a*, 29*b* are threaded inside, most preferably for ¼ inch to 2 inch fine or coarse threads. Single, double or triple threads may be used. The threaded journals allow the threaded rod a journal area along the rod using a bearing or bushing.

The second 45 degree mitered gear 23*b* is attached to the end of the threaded rod 30 such that rotation of the second gear 23*b* clockwise rotates the threaded rod 30 clockwise. Conversely, rotation of the second gear 23*b* counterclockwise rotates the threaded rod 30 counterclockwise. As the threaded rod 30 rotates, a conventional, threaded T-nut 40 threaded on the rod 30 between the internal bearing housing 35 and the external bearing housing 24 travels along the rod 30. If the threaded rod 30 rotates clockwise, the T-nut 40 travels in one direction along the threaded rod 30. If the threaded rod 30 rotates counterclockwise, the T-nut 40 travels in the opposite direction along the threaded rod 30 (see FIGS. 4 and 5).

A planar, substantially rectangular-shaped carrier arm 41 inserted into a slot 42 of the T-nut 40 extends in a substantially vertical direction from the T-nut 40. As depicted in FIG. 4, the carrier arm 41 comprises a generally circular arm aperture 43, which is aligned with a generally circular T-nut aperture 44 spanning the T-nut 40. The threaded rod 30, then, extends through both the arm aperture 43 and the T-nut aperture 44 (see FIG. 4). The arm aperture 43 is of a sufficient diameter to clear the rod 30 so that the carrier arm 41 does not strip the threads of the rod 30. Several rivets 38 extending through generally circular arm rivet holes 45 in an upper end of the carrier arm 41 and into an edge of the hurricane shutter panel 11 mount the carrier arm 41 to the hurricane shutter panel 11. Other suitable means, such as bolts or glue, may be used for fastening the carrier arm to the hurricane shutter panel 11 or other object to be moved. The journal bearings 29*a*, 29*b* at each end of the threaded rod 30 allow the rod to rotate, carrying the carrier arm 41, and the object attached to it, in one direction or the other. Although the gear shaft assembly 10 can be retrofitted on an existing hurricane shutter, it is preferably incorporated into a shutter assembly in a manufacturing plant and installed on-site.

Within the lower housing channel 14, a plurality of spaced apart, narrow support disks 46 are rotatably attached to the lower housing front wall 17 and rear wall 18. The support disks 46 are same sized and generally cylindrical in shape. Each support disk 46 has a generally circular disk hole 49 through its center. To attach the disks to the lower housing walls 17, 18, set screws 47 are preferably inserted through generally circular, spaced apart lower housing wall holes 48 bored through the lower housing walls 17, 18 and the disk holes 49. Nuts 50 threaded on the set screws 47 abutting the lower housing walls 17, 18 hold the support disks 46 in place adjacent to the lower housing walls 17, 18. The set screws 47 and the nuts 50 permit the support disks 46 to rotate freely. A bottom edge of the shutter panel 11 rests on the support disks 46. The support disks are beneficial in that they guide the shutter panel 11 and keep it elevated above the threaded rod 30 and the first and second gears 23*a*, 23*b*, so the shutter panel does not rest on the threaded rod. Also, the bottom edge of the shutter panel 11 rests on a top edge of the internal bearing housing 35, which helps maintain the shutter panel in position and avoids interference with the threaded rod.

Preferably, the end of the drive shaft 15 behind the shutter panel (see FIG. 5) protrudes through an interior wall of a building so that the end of the drive shaft 15 is flush with the interior wall. The end of the drive shaft 15 that is flush with the interior building wall (not shown) is preferably capped with a cover (not shown). The drive shaft cover is painted the color of the interior wall and camouflages the end of the drive shaft 15 so that it is unobtrusive. The gear shaft assembly 10 is compact and hidden from view, yet it can readily be accessed for repair or maintenance.

In use, a user first removes the drive shaft cover from the drive shaft 15. Then the user engages a screw driver having a square head, or a ratchet, with the square-shaped orifice 51 of the drive shaft 15. The screw driver may be hand-operated or electric. Operating an electric screw driver in forward mode (or turning a hand-operated screw driver clockwise) rotates the drive shaft 15 clockwise. This rotates the first 45 degree mitered gear 23*a* clockwise. As the teeth of the first 45 degree mitered gear 23*a* successively engage the teeth of the second 45 degree mitered gear 23*b*, clockwise rotation of the first mitered gear 23*a* induces clockwise rotation of the second mitered gear 23*b*. In turn, clockwise rotation of the second gear 23*b* causes clockwise rotation of the threaded rod 30. The lock nuts 34 allow the threaded rod 30 to rotate in place without shifting along the lower housing channel 14. As the threaded rod 30 rotates clockwise, the T-nut 40 and the carrier arm 41 advance along the threaded rod in a direction away from the external bearing housing 24 and toward the internal bearing housing 35, carrying with them the attached shutter panel 11. As a result, the shutter panel 11 gradually slides out of the lower housing channel 14 and obstructs the window.

The gear shaft assembly 10 is designed so that the support disks 46 bear the weight of the shutter panel 11 and reduce friction between the lower housing walls 17, 18 and the shutter panel 11. The internal bearing housing 35 also bears the weight of the shutter panel 11 and prevents the T-nut 40 from impacting the second gear 23*b*. The shutter panels 11 may be made from one piece of material or several pieces of material. Preferably, the shutter panels 11 are made of aluminum.

To retract the hurricane shutter panel 11 within the lower housing channel 14, the user removes the drive shaft cover (not shown) from the drive shaft 15. Then the user inside the house or other building engages a screw driver having a square head, or a ratchet, with the square shaped orifice 51 of the drive shaft 15. Operating an electrically-operated screw driver in reverse mode (or turning a hand-operated screw driver counterclockwise) turns the drive shaft 15 counterclockwise. This causes the first 45 degree mitered gear 23*a* outside the house behind the shutter panel to rotate counterclockwise. As the teeth of the first 45 degree mitered gear 23*a* engage the teeth of the second 45 degree mitered gear 23*b*, counterclockwise rotation of the first gear 23*a* induces counterclockwise rotation of the second gear 23*b*. In turn, counterclockwise rotation of the second gear 23*b* causes counterclockwise rotation of the threaded rod 30. The counterclockwise rotation of the threaded rod 30 causes the T-nut 40 and the carrier arm 41 to advance along the threaded rod away from the internal bearing housing 35 toward the external bearing housing 24, carrying with them the attached hurricane shutter panel 11. As a result, the hurricane shutter panel 11 slides into the lower housing channel 14 so that it no longer obstructs the window.

Again, the support disks 46 bear the weight of the shutter panel 11 and reduce friction between the lower housing walls 17, 18 and the shutter panel 11. The internal bearing housing 35 also bears the weight of the shutter panel 11. The external bearing housing 24 prevents the shutter panel from sliding out of the end of the lower housing channel 14.

Figure 6:
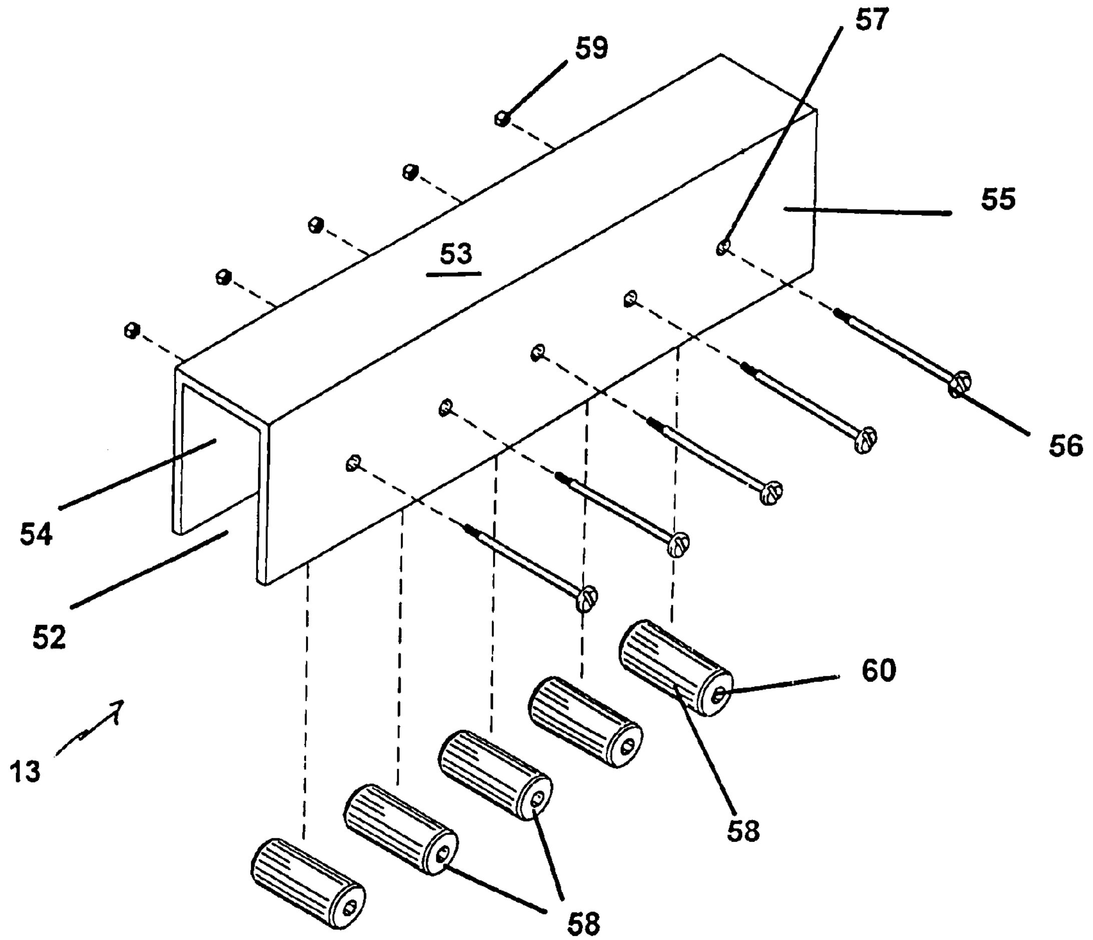
FIG. 6 is an exploded, perspective view of an upper channel assembly of a gear shaft assembly according to FIG. 1.

Turning to FIG. 6, the gear shaft assembly 10 includes an upper channel assembly 13 above the shutter panel 11 in addition to the lower channel assembly 12 below the shutter panel 11. The upper channel assembly 13 serves to guide and stabilize the shutter panel 11 as it moves back and forth in the lower channel 14.

As depicted in FIGS. 3 and 6, the U-shaped upper channel assembly 13 comprises an upper channel 52 formed by an upper channel top wall 53, an upper channel front wall 54, and an upper channel rear wall 55, each of which is generally rectangular in shape. The upper channel front wall 54 and the upper channel rear wall 55 are substantially perpendicular to the upper channel top wall 53 and extend generally vertically downward from the upper channel top wall 53.

Continuing with FIGS. 3 and 6, sets of matching upper channel wall holes 57 through the opposite upper channel walls 54, 55 receive upper channel set screws 56, with one screw 56 through each set of two opposite holes 57. Each upper channel screw 56 extends through a roller aperture 60 in a cylindrical roller 58. Each upper channel roller 58 is positioned transversely in the upper channel 52, with a number of parallel rollers 58 extending across the upper channel 52. The upper channel set screws 56 maintain the rollers 58 within the upper channel 52. Nuts 59 threaded on the ends of the upper channel set screws 56 abutting the upper channel front wall 54 further secure the rollers 58 in the upper channel 52. The rollers 58 rotate freely on the upper channel set screws 56. An upper edge of the object, such as a hurricane panel, rolls across the upper channel rollers as the object is moved by the lower channel assembly.

The upper channel assembly 13 and lower housing 63 are preferably made of aluminum or steel. They are preferably channel-shaped, but may be round pipe or rectangular/square hollow steel. The upper channel 52 may telescope to accommodate a wider or narrower window and therefore a larger or smaller number of rollers 58. The lower housing 63 may telescope so as to accommodate the variable length threaded rod. One gear shaft assembly kit comprising two matching upper channel assemblies 13 and two matching lower channel assemblies 12 can therefore be altered to accommodate a variety of window sizes.

In use, the upper channel assembly 13 is oriented directly above the lower channel assembly 12, as seen in FIGS. 1 and 2. An upper edge of the shutter panel 11 slides along the upper channel rollers 58 as the shutter panel 11 moves back and forth along the lower channel 14 and the upper channel 52. The upper channel front wall 54 and the upper channel rear wall 55 brace the upper end of the shutter panel 11 so that it does not wobble from side to side as it moves.

As seen in FIGS. 1 and 2, an upper end of an attractive false shutter 61 is preferably attached to the front wall 54 of the upper channel assembly 13, and a lower end of the false shutter 61 is attached to the first front wall 54 of the lower channel assembly 12. The false shutter 61 blocks the upper and lower channel assemblies 12, 13 from view, and also hides the shutter panel 11 when the shutter panel is fully retracted within the channel assemblies 12, 13. The false shutter 61 imparts an attractive appearance to the window.

Continuing with FIG. 1, the gear shaft assembly 10 is normally mounted on an exterior wall of the building (not shown) adjacent to one side of a window, and a mirror image gear shaft assembly 10 is mounted on the exterior wall of the building adjacent to the other side of the window. The shutter panel 11 mounted on the carrier arm 41 of the left gear shaft assembly 10 moves out from the right side of the left gear shaft assembly 10, while the shutter panel 11 mounted on the carrier arm 41 of the right gear shaft assembly 10 moves out from the left side of the right gear shaft assembly 10. Thus each shutter panel 11, when fully protracted from its gear shaft assembly 10, covers half of the window. As illustrated in FIG. 1, a rebate or step 62 longitudinally oriented along the edge of each complementary shutter panel 11 assures that the panels 11 properly seal together when they are closed.

Unlike commercially available shutters, the present gear shaft assembly 10 is conformable to virtually any size window. The unique lockable journal bearings 29 allow the length of the threaded rod 30 to be custom cut for each window. The length of the channels 14, 52, the number of support disks 46, and the number of upper channel rollers 58 will also vary depending upon the size of the window. During installation, an installer selects lower and upper channels 14, 52 of appropriate length depending upon the width of the shutter panel 11 required for the particular window. The installer also cuts an appropriate length of threaded rod 30 (e.g. the installer cuts a 36 inch rod down to 24 inches) for the lower channel 14. Of course, as the width of the window increases, the width of the shutter panel 11 increases, and the lower and upper channel assemblies 12, 13 must comprise a greater number of support disks 46 and upper channel rollers 58 to guide and support the weight of the shutter panels 11.

The upper channel assembly 13 and the rest of the lower channel assembly 12 may be assembled on-site or at the factory for quicker installation. The gear shaft assembly 10 is easily manufactured because all of its components may be manufactured in one size, except the lower channel 14 and the upper channel 52.

As previously described, movement of each shutter panel 11 is controlled by a separate gear shaft assembly 10. However, movement of both shutter panels 11 may be simultaneously controlled by an alternate embodiment, called here a tandem gear shaft assembly 70 shown in FIG. 7. For purposes of illustration, one end of the tandem gear shaft assembly 70, and the shutter panels are not shown in FIG. 7.

Figure 7:
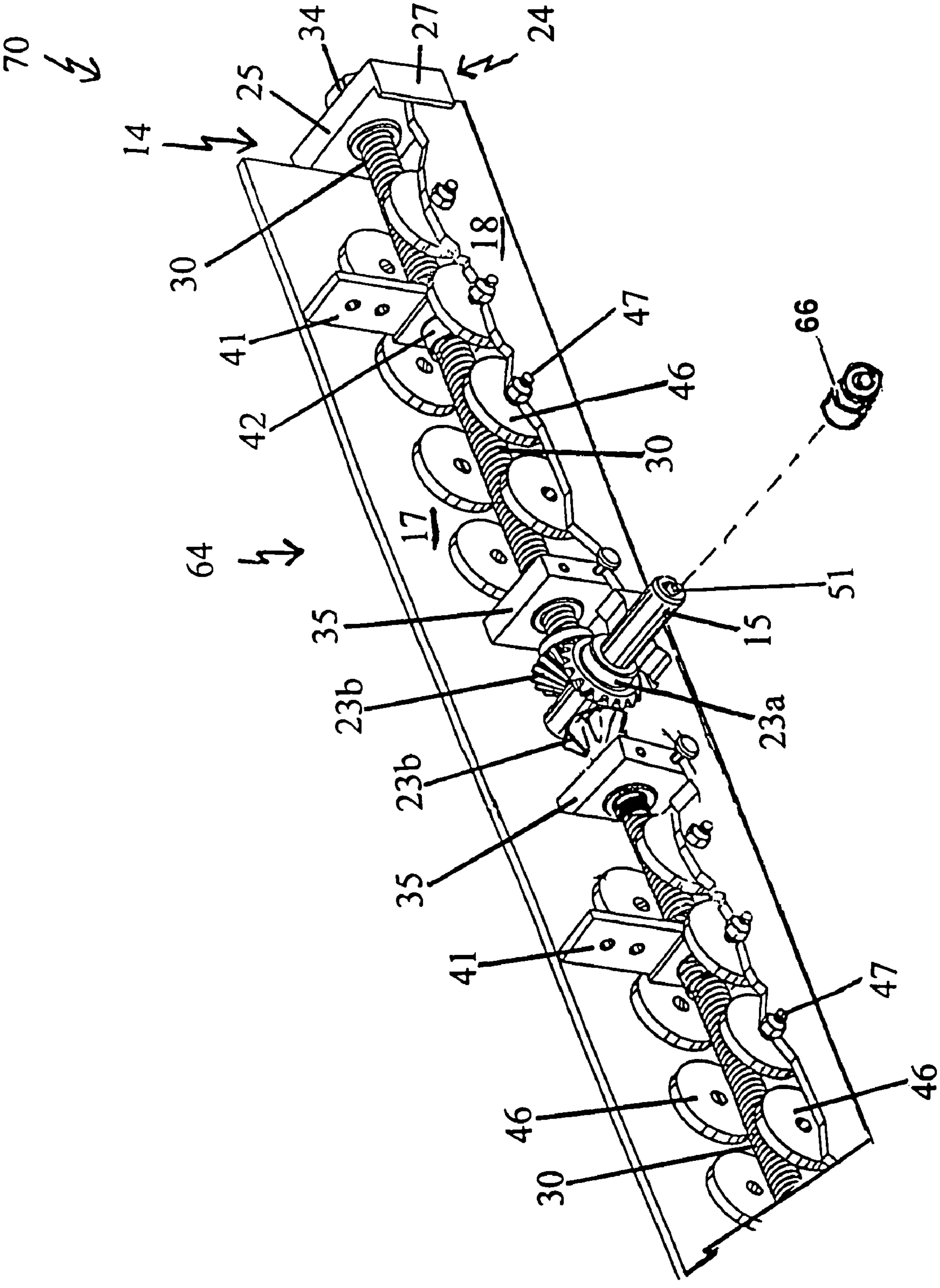
FIG. 7 is a perspective view of an alternative embodiment of a tandem gear shaft assembly according to the present invention, shown without hurricane shutter panels.

As seen in FIG. 7, the tandem gear shaft assembly 70 for simultaneous linear movement of two objects attached to the assembly 70 includes a second lower channel assembly, which includes:

(a) two same-sized threaded rods 30 oriented in the same direction as one another;

(b) a first gear 23*a* between two ends of the two threaded rods;

(c) two same-sized second gears 23*b*, each engageable with the first gear 23*a* and attached to the end of each of the threaded rods 30;

(d) a mechanism attached to the first gear for driving the first gear against the second gears, preferably a drive shaft 15 attached to the first gear 23*a*, which is oriented generally perpendicular to the threaded rods;

(e) at least two same-sized threaded journal bearings 29, each threaded on one of the correspondingly threaded rods;

(f) at least two same sized bearing housings 24 or 35, each holding one of the at least two journal bearings; and (g) two same sized movable carrier arms 41, each mounted on one of the threaded rods, each being attached to one of the objects. The second gears 23*b* are preferably positioned on opposite sides of the drive shaft 15 and each contact the first gear 23*a*. The first and second gears are preferably 45 degree mitered gears, although they can be spur, worm, or bevel gears. The two objects are preferably two complementary shutter panels 11, each shutter panel being affixed to one of the two movable arms 41. Each of the journal beatings 29 or 35 is secured in one of the at least two bearing housings 24 or 35.

In the tandem gear shaft assembly embodiment 70 of FIG. 7, two mirror image assemblies 10 are coupled such that a single drive shaft 15 and a single first gear 23*a* simultaneously drive the second gears 23*b*. Each second gear 23*b* engages an opposite side of the first gear 23*a*. When the drive shaft 15 turns in one direction, it causes the first gear 23*a* to turn in the same direction. Both second gears 23*a* and the two threaded rods 30 then rotate, causing both of the shutter panels 11 to close over the window, or door. This saves time, since it requires turning only one drive shaft 15 per window. When the drive shaft 15 turns in the opposite direction, it causes the first gear 23*a* to also turn in the same opposite direction. Both second gears 23*a* and the threaded rods 30 then rotate so that the two shutter panels 11 close at the same time.

The tandem gear assembly 70 includes a tandem lower housing 64 that resembles the single lower housing 63, except that the tandem lower housing 64 is almost twice as long and the drive shaft apertures 21, 22 occur at the center of the tandem lower housing rather than near one end. The channel-shaped tandem lower housing 64 is formed from a lower housing bottom wall 16, front wall 17, and rear wall 18, each of which is generally rectangular in shape. The tandem lower housing may alternatively be round or rectangular/square. There are two mirror image external bearing housings 24 at the opposite ends of the tandem lower housing 64, each with an end of a threaded rod 30 extending into it. There is a lock nut 34 outside each external bearing housing 24.

In addition to manually/mechanically opening or closing shutter panels using the gear shaft assembly 10, 70, a conventional electrical mechanism may be employed for rotating the drive shaft 15 of either gear shaft assembly 10, 70. Using this electrical mechanism, the user need only push a button to open or close the shutter panels 11 over a window or door. An electric motorized mechanism may be backed up by a hand crank in case the motor or power fails. The electric opening/closing mechanism may be operated with a remote device, so the shutter panels can be opened or closed from within a home, for example. Mechanisms for operating the gear shaft assembly 10, 70 by telephone or instructions from a personal computer or cellular device may be employed. With such a mechanism in place, a user visiting another state who hears of hurricane warnings for his coastal home state could telephone home and instruct the gear shaft assembly 10, 70 to close all of the shutter panels on the house.

The tandem gear shaft assembly 70 is also conformable to virtually any size window. Again, only the length of the threaded rod 30, the length of the lower and upper channels 14, 52, the number of support disks 46, and the number of upper channel rollers 58 vary depending on the size of the window. The tandem gear shaft assembly 70 is installed in the same manner as the gear shaft assembly 10.

As extra insurance against jamming of the assembly over time, the tandem gear shaft assembly preferably includes an in-line slip clutch 66, preferably on the input drive. The slip clutch 66 signals that the shutter panels, or other objects attached to the assembly, are closed, and provides protection from overload during closing or opening of the shutter panels.

In addition to shutter panels, the carrier arm 41 may be attached to any object to move the object in a linear direction. The gear shaft assembly 10, 70 may move the object in a horizontal plane, a vertical plane, or a plane oriented between a horizontal plane and a vertical plane.

Figure 8:
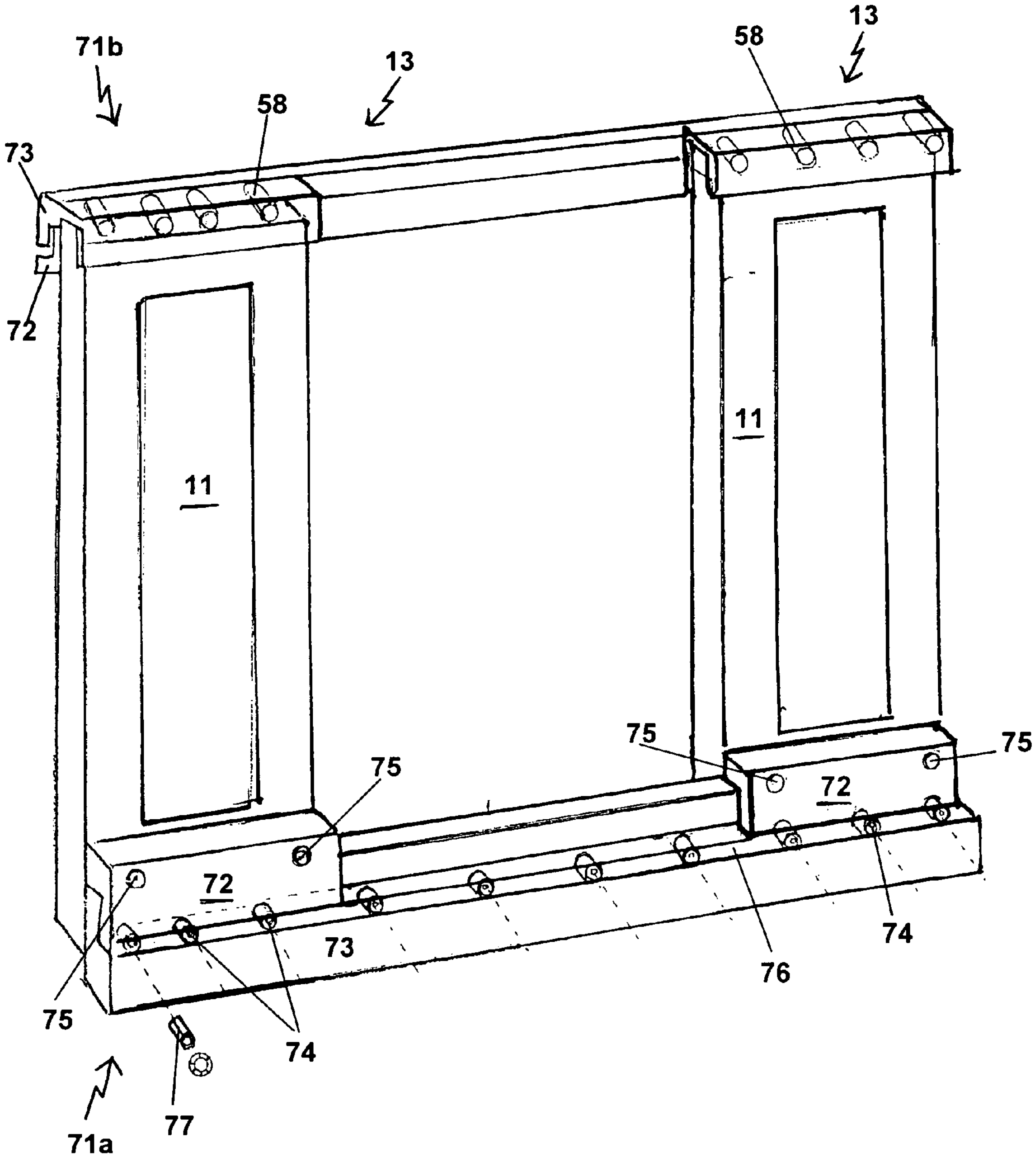
FIG. 8 is a rear perspective view of a sliding attachment system of a gear shaft assembly according to the present invention.
Figure 9:
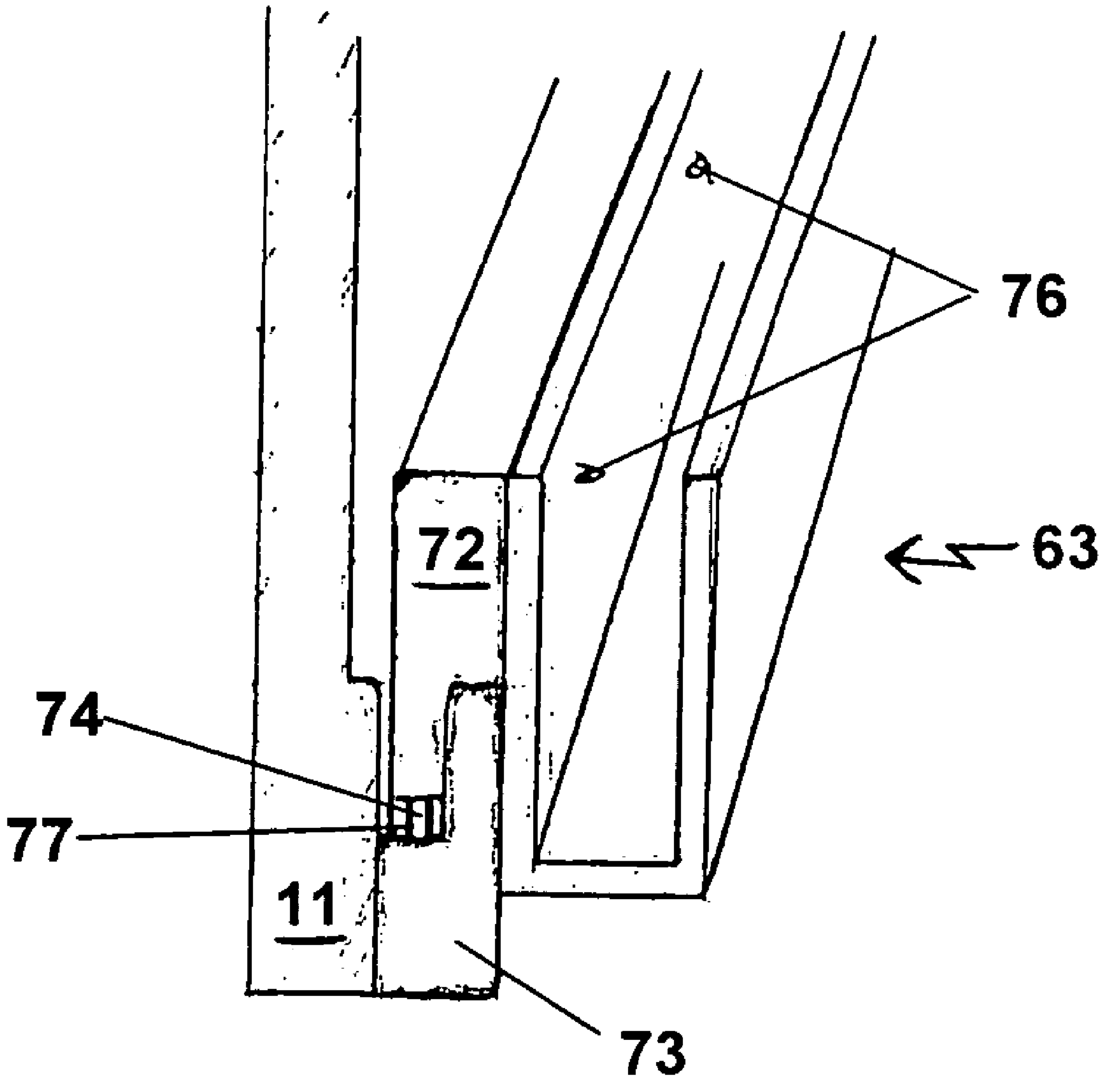
FIG. 9 is an end view of a sliding attachment system of a gear shaft assembly according to the present invention.

Turning to FIGS. 8 and 9, the gear shaft assembly 10 preferably further comprises a slidable attachment system 71 for attaching the lower channel assembly 12, and preferably also the upper channel assembly 13, to the window area. The slidable attachment system 71 comprises a set of puzzle-piece L-shaped bars 72, 73, with slidable attachment rollers 74 between them. The L-shaped bars 72, 73 fit together like two puzzle pieces to form substantially a rectangular-shaped bar, except for a channel 76 between them wide enough to insert a number of small, side by side slidable attachment rollers 74. One L-shaped bar, the window sill bar 73, is attached to the window sill or frame, preferably by means of rivets. A second L-shaped bar, the slidable bar 72, is slidable back and forth along the window sill bar 73 on the slidable attachment rollers 74. The L-shaped bars 72, 73 in transverse cross-section are substantially mirror shaped (see FIG. 9), but the slidable bars 72 are each approximately half the length of the window sill bar 73.

Continuing with FIGS. 8 and 9, two matching slidable bars 72 are slidable on one window sill bar 73, and a gear shaft assembly kit for a window includes two matching slidable bars 72 and one corresponding window sill bar 73, and a number of slidable attachment rollers 74. The gear shaft assembly 10 preferably includes a slidable attachment system 71*b* for attaching the upper channel assembly 13 to the window area. The upper attachment system 71*b* is similar to the lower attachment system 71*a*, except that the upper attachment system is upside down (also see FIG. 3). A preferred complete gear shaft assembly kit would therefore include four slidable bars 72, two window sill bars 73, and a number of attachment rollers. The L-shaped bars 72, 73 are preferably made of aluminum, and the slidable attachment rollers 74 are preferably made of an impact resistant machine nylon material. The slidable attachment rollers 74 are preferably secured in place by stainless steel rivets 77.

In FIG. 8, the slidable attachment system 71 is shown from the rear without a lower housing or building wall for purposes of illustration. FIG. 9 does show a lower housing 63 attached to the slidable bar 72, preferably by means of rivets 76 extending through holes in the slidable bar. The lower channel bolts directly to the building across the window sill facing. As it goes into the wall facing, it is supported by a cushioned spacer.

The gear assembly shaft 10 can be fitted inside a side arm of a Bahamas shutter, which pivots towards and away from a window. The Bahamas shutters can then be manually or electrically opened and closed from inside or outside the building on which they are installed.

A solar panel can be attached to the gear shaft assembly 10, or two solar panels can be attached to a tandem gear shaft assembly 70, so that the solar panel(s) can be opened or closed from inside the building housing them, either manually or via a motorized mechanism. Alternatively, an impact resistant sliding glass door coated with a thermal insulative coating may be attached to a gear shaft assembly 10 for movement of the door in a forward or backward direction (open or closed).

The present invention further includes a method for installing a gear shaft assembly 10 on a window, including the steps of:

(a) cutting a length of threaded rod 30 to correspond to a size of the window;

(b) setting a journal bearing 29*b* in an internal bearing housing 35 in a lower channel assembly;

(c) inserting a first end of the threaded rod 30 into the journal bearing 29*b;*

(d) fastening a lock nut 34 on the end of the journal bearing 29*b* to hold the journal bearing in place;

(e) placing a movable, correspondingly threaded carrier arm 41 on the threaded rod 30;

(f) attaching a second gear 23*b* on the first end of the threaded rod 30;

(g) inserting a drive shaft 15 attached to a first gear 23*a* in the lower channel assembly along with the threaded rod, so that the first gear 23*a* meshes with the second gear 23*b*, the drive shaft 15 being transversely oriented to the threaded rod 30; and (h) mounting the lower channel assembly 12 beneath the window.

The method preferably further includes the steps between steps (e) and (f) of:

(e2) setting a second journal bearing 29*a* in an external bearing housing 24;

(e3) inserting a second end of the threaded rod 30 through the second journal bearing 29*a*; and (e4) fastening a second lock nut 34 on the second end of the threaded rod 30 to hold the second journal bearing 29*a*. Also preferred are the steps of: affixing the carrier arm 41 to a lower end of a shutter panel 11; and attaching an upper channel assembly 13 to an upper end of the shutter panel 11.

From the foregoing it can be realized that the described device of the present invention may be easily and conveniently utilized as a gear shaft assembly for opening and closing hurricane shutter panels or actuating linear movement of another object. It is to be understood that any dimensions given herein are illustrative, and are not meant to be limiting.

While preferred embodiments of the invention have been described using specific terms, this description is for illustrative purposes only. It will be apparent to those of ordinary skill in the art that various modifications, substitutions, omissions, and changes may be made without departing from the spirit or scope of the invention, and that such are intended to be within the scope of the present invention as defined by the following claims. It is intended that the doctrine of equivalents be relied upon to determine the fair scope of these claims in connection with any other person's product which fall outside the literal wording of these claims, but which in reality do not materially depart from this invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A gear shaft assembly for actuating linear movement of an object attached thereto, the gear shaft assembly comprising a lower channel assembly, the lower channel assembly comprising:

(a) a threaded rod;

(b) a first gear adjacent an end of the threaded rod;

(c) a second gear engageable with the first gear and attached to the end of the threaded rod;

(d) a mechanism for driving the first gear against the second gear;

(e) at least one threaded journal bearing threaded on the correspondingly threaded rod;

(f) at least one bearing housing supporting the at least one journal bearing;

(g) a movable carrier arm mounted on the threaded rod and attachable to the object;

wherein, when the mechanism for driving the first gear against the second gear is activated, the first gear drives the second gear, rotating the threaded rod, and moving the carrier arm on the threaded rod.

2. The gear shaft assembly according to claim 1, further comprising at least one lock nut threaded on the threaded rod for securing the at least one journal bearing in the at least one bearing housing.

3. The gear shaft assembly according to claim 2, the lower channel assembly further comprising a lower housing, the lower housing comprising:

(a) a lower housing bottom wall;

(b) a lower housing front wall oriented generally perpendicularly to the lower housing bottom wall and extending upward from the lower housing bottom wall;

(c) a lower housing rear wall oriented generally perpendicularly to the lower housing bottom wall and extending upward from the lower housing bottom wall; and (d) a lower housing channel formed by the lower housing bottom wall, the lower housing front wall, and the lower housing rear wall;

wherein the at least one bearing housing is mounted to the lower housing, and the threaded rod extends longitudinally through the lower housing channel.

4. The gear shaft assembly according to claim 3, wherein the at least one bearing housing is an internal bearing housing and an external bearing housing, the internal bearing housing spanning the lower channel adjacent an end of the lower channel, the external bearing housing being attached to the lower housing at an opposite end of the lower channel.

5. The gear shaft assembly according to claim 4, wherein the at least one journal bearing is a first journal bearing and a second journal bearing, the first journal bearing being removably insertable in the external bearing housing, and the second journal bearing being removably insertable in the internal bearing housing.

6. The gear shaft assembly according to claim 5, wherein the at least one lock nut is a first lock nut and a second lock nut, the first lock nut abutting the first journal bearing, and the second lock nut abutting the second journal bearing.

7. The gear shaft assembly according to claim 3, the lower channel assembly further comprising a plurality of same sized, spaced apart support disks rotatably attached to the lower housing front wall and the lower housing rear wall for guiding the object.

8. The gear shaft assembly according to claim 3, wherein the first gear and second gear are identical 45 degree mitered gears, and the mechanism for driving the first gear against the second gear is a rotatable drive shaft in the lower channel assembly.

9. The gear shaft assembly according to claim 8, wherein the first mitered gear is attached to the rotatable drive shaft, the drive shaft extending through the lower housing front wall and the lower housing rear wall and transversely spanning the lower housing channel.

10. The gear shaft assembly according to claim 9, the lower channel assembly further comprising a shaft support attached to the lower housing rear wall and the drive shaft extending through the shaft support.

11. The gear shaft assembly according to claim 3, the lower channel assembly further comprising a movable T-nut threaded on the threaded rod between the second gear and the bearing housing, the T-nut being connected to the carrier arm, the carrier arm extending generally upward from the T-nut.

12. The gear shaft assembly according to claim 1, further comprising an upper channel assembly comprising:

(a) an upper channel top wall;

(b) an upper channel front wall oriented generally perpendicular to the upper channel top wall and extending downward from the upper channel top wall;

(c) an upper channel rear wall oriented generally perpendicularly to the upper channel top wall and extending downward from the upper channel top wall;

(d) an upper channel formed by the upper channel top wall, the upper channel front wall, and the upper channel rear wall; and (e) a mechanism for guiding an upper end of the object.

13. The gear shaft assembly according to claim 12, further comprising an upper channel assembly slidable attachment system, which comprises two matching L-shaped slidable bars, a corresponding L-shaped window sill bar, and a plurality of slidable attachment rollers; wherein the window sill bar is attached to a frame of the window, the slidable bars are slidable in a horizontal direction on the window sill bar, and the slidable attachment rollers are set into two matching horizontally oriented channels between each of the slidable bars and the window sill bar; and wherein the slidable bars are each attachable to the upper channel assembly.

14. The gear shaft assembly according to claim 12, wherein the mechanism for guiding an upper end of the object is a plurality of spaced apart rollers rotatably mounted to the upper channel front wall and the upper channel rear wall and transversely spanning the upper channel.

15. The gear shaft assembly according to claim 14, wherein the object is a hurricane shutter panel.

16. The gear shaft assembly according to claim 15, wherein the lower housing rear wall and the upper channel rear wall are attached to an exterior wall of a building adjacent a window or door, and the drive shaft extends through the exterior wall into an interior of the building.

17. The gear shaft assembly according to claim 1, further comprising a slidable attachment system, which comprises at least one L-shaped slidable bar, a corresponding L-shaped window sill bar, and a plurality of slidable attachment rollers; wherein the window sill bar is attachable to a frame of the window, the at least one slidable bar is slidable in a horizontal direction on the window sill bar, and the slidable attachment rollers are set into a horizontally oriented channel between the at least one slidable bar and the window sill bar.

18. The gear shaft assembly according to claim 17, wherein the lower housing is attached to a side of the at least one slidable bar.

19. A tandem gear shaft assembly for actuating simultaneous linear movement of two objects attached thereto, the tandem gear shaft assembly comprising a second lower channel assembly, the second lower channel assembly comprising:

(a) two same-sized threaded rods oriented in the same direction as one another;

(b) a first gear between two ends of the two threaded rods;

(c) two same-sized second gears, each engageable with the first gear and attached to the end of each of the threaded rods;

(d) a mechanism attached to the first gear for driving the first gear against the second gears;

(e) at least two same-sized threaded journal bearings, each threaded on one of the correspondingly threaded rods;

(f) at least two same sized bearing housings, each holding one of the at least two journal bearings; and (g) two same sized movable carrier arms, each mounted on one of the threaded rods, each being attached to one of the objects.

20. The tandem gear shaft assembly according to claim 19, wherein the first gear and second gears are identical 45 degree mitered gears, and the driving mechanism attached to the first gear is a drive shaft, the drive shaft being oriented generally perpendicular to the threaded rods.

21. The tandem gear shaft assembly according to claim 19, wherein the objects are two complementary shutter panels, each shutter panel being affixed to one of the two movable carrier arms.

22. A method for installing a gear shaft assembly on a window, the method comprising the steps of:

(a) cutting a length of threaded rod to correspond to a size of the window;

(b) setting a journal bearing in an internal bearing housing in a lower channel assembly;

(c) inserting a first end of the threaded rod into the journal bearing;

(d) fastening a lock nut at the end of the journal bearing;

(e) placing a movable, correspondingly threaded carrier arm on the threaded rod;

(f) attaching a second gear on the end of the threaded rod;

(g) inserting a drive shaft attached to a first gear in the lower channel assembly along with the threaded rod, so that the first gear meshes with the second gear, the drive shaft being transversely oriented to the threaded rod; and (h) mounting the lower channel assembly beneath the window.

23. The method according to claim 22, further comprising the steps of affixing the carrier arm to a lower end of a window shutter panel, and attaching an upper channel assembly to an upper end of the window shutter panel.

24. The method according to claim 23, further comprising the steps between steps (e) and (f) of:

(e2) setting a second journal bearing in an external bearing housing;

(e3) inserting a second end of the threaded rod through the second journal bearing; and (e4) fastening a second lock nut on the second end of the threaded rod to hold the second journal bearing.

* * * * *